E. O. BRINCKERHOFF.
Water-Closet Valve.
No. 159,297.
Patented Feb. 2, 1875.
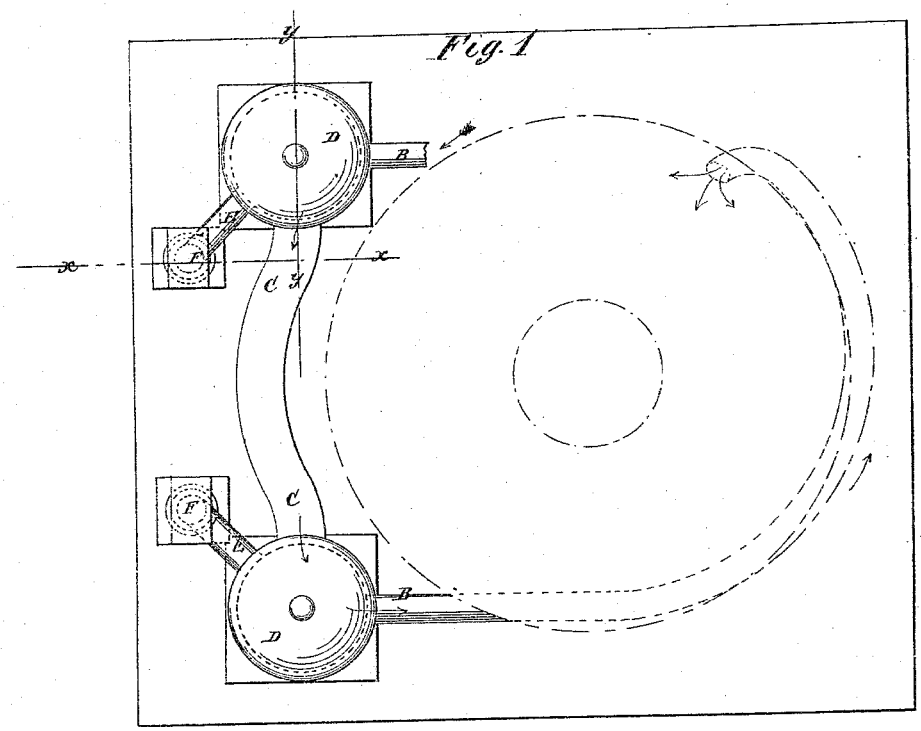
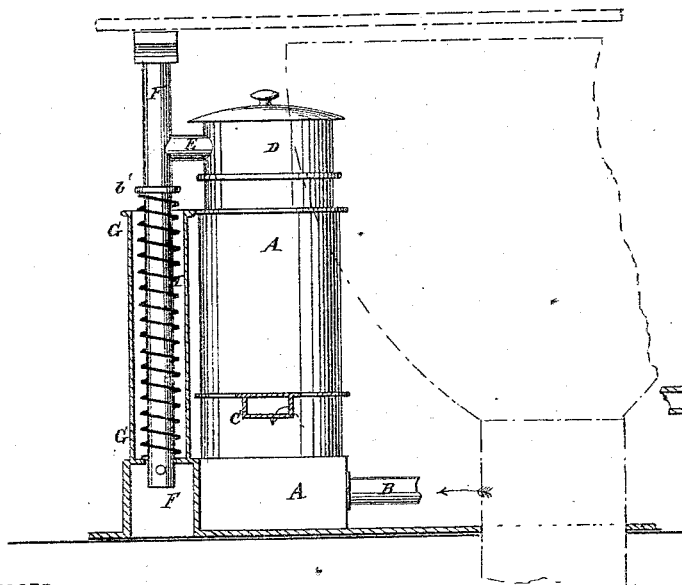
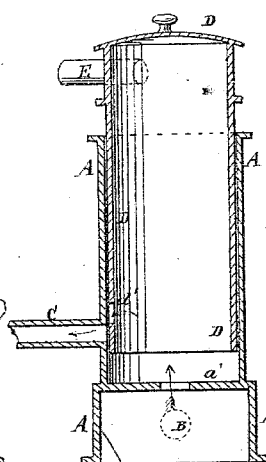

UNITED STATES PATENT OFFICE.

EDWIN O. BRINCKERHOFF, OF NEW YORK, N. Y.

IMPROVEMENT IN WATER-CLOSET VALVES.

Specification forming part of Letters Patent No. 159,297, dated February 2, 1875; application filed January 11, 1875.

*To all whom it may concern:*

Be it known that I, EDWIN O. BRINCKERHOFF, of the city, county, and State of New York, have invented a new and Improved Socket-Valve for Water-Closets, of which the following is a specification:

Figure 1 is a top view of my improved socket-valve. Fig. 2 is a detail section of the same, taken through the line $x$ $x$, Fig. 1. Fig. 3 is a detail section of the same, taken through the line $y$ $y$, Fig. 1.

My invention has for its object to furnish an improved socket-valve for water-closets, simple in construction, inexpensive in manufacture, reliable in operation, and not liable to get out of order.

The invention consists in the combination of the two sockets provided with the water-pipes and the connecting-pipe, the two cups or valves, the connecting-arms, the rods, the springs, and their sockets with each other, to adapt them for use in connection with a water-closet bowl or basin and seat, as hereinafter fully described.

A are two sockets, placed upon the opposite sides of the forward part of the bowl or basin. The lower part of each of the sockets A is provided with a pipe, B. One of the pipes B is connected with the water-supply pipe, and the other pipe B is connected with a pipe leading into the bowl or basin. The sockets A are connected by a square pipe or channel, C, the middle part of which is curved forward to take it out of the way of the bowl or basin. D are two inverted tubular cups, which fit into and move up and down in the sockets A, water-tight. The downward movement of the tubular cups D is limited by a flange or partition, $a'$, in the lower part of the sockets A, and which has an opening through its middle part for the passage of the water. In the side of the cups or valves D is formed an opening, $d'$, similar in shape and size to the cavity of the pipe C, and in such a position as to be directly opposite the ends of said pipe when the lower edges of the said cups rest upon the partitions or flanges $a'$. To the upper parts of the cups or valves D, above the upper edges of the sockets A, are rigidly attached arms E, the other ends of which are rigidly attached to two rods, F, that pass down through sockets G, and may have stop-pins or nuts applied to their lower ends below the bottom of said sockets G. H are coiled springs placed in the sockets G, and through which the rods F pass. The lower ends of the springs H rest upon the bottoms of the sockets G, and their upper ends rest against shoulders or collars $f'$, formed upon or attached to the rods F. The tension of the spring H may be regulated in any suitable manner, but preferably by nuts screwed upon the lower ends of the rods F. The rods F have caps formed upon their upper ends, upon which the seat of the water-closet is designed to rest.

With this construction, the weight of the person using the water-closet forces down the rods F and cups or valves D, compressing the springs H, and bringing the openings $d'$ of the cups or valves D opposite the open ends of the pipe C, so that the water may flow freely, and may continue to flow as long as the weight of the person rests upon the seat. As the weight of the person is removed the elasticity of the springs H raises the rod F and the cups or valves D, stopping the flow of the water.

Having thus described my invention, what I claim as new, and desire to secure by Letters Patent, is—

The combination of the two sockets A, provided with the pipes B and the connecting-pipe C, the two cups or valves D, the connecting-arms E, the rods F, the springs H, and the sockets G, with each other, to adapt them for use in connection with a water-closet bowl or basin and seat, substantially as herein shown and described.

EDWIN O. BRINCKERHOFF.

Witnesses:
JAMES T. GRAHAM,
T. B. MOSHER.